UNITED STATES PATENT OFFICE.

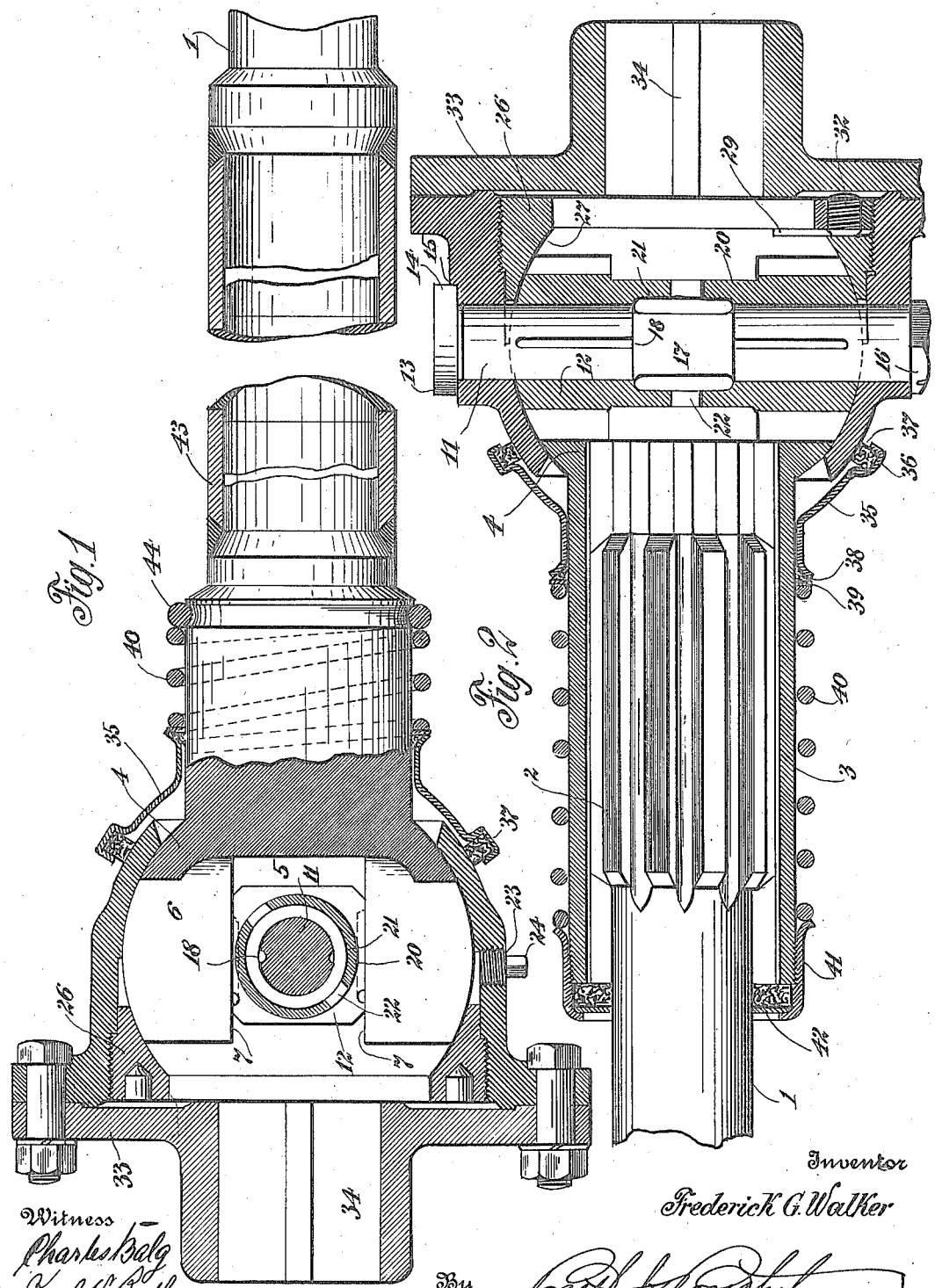

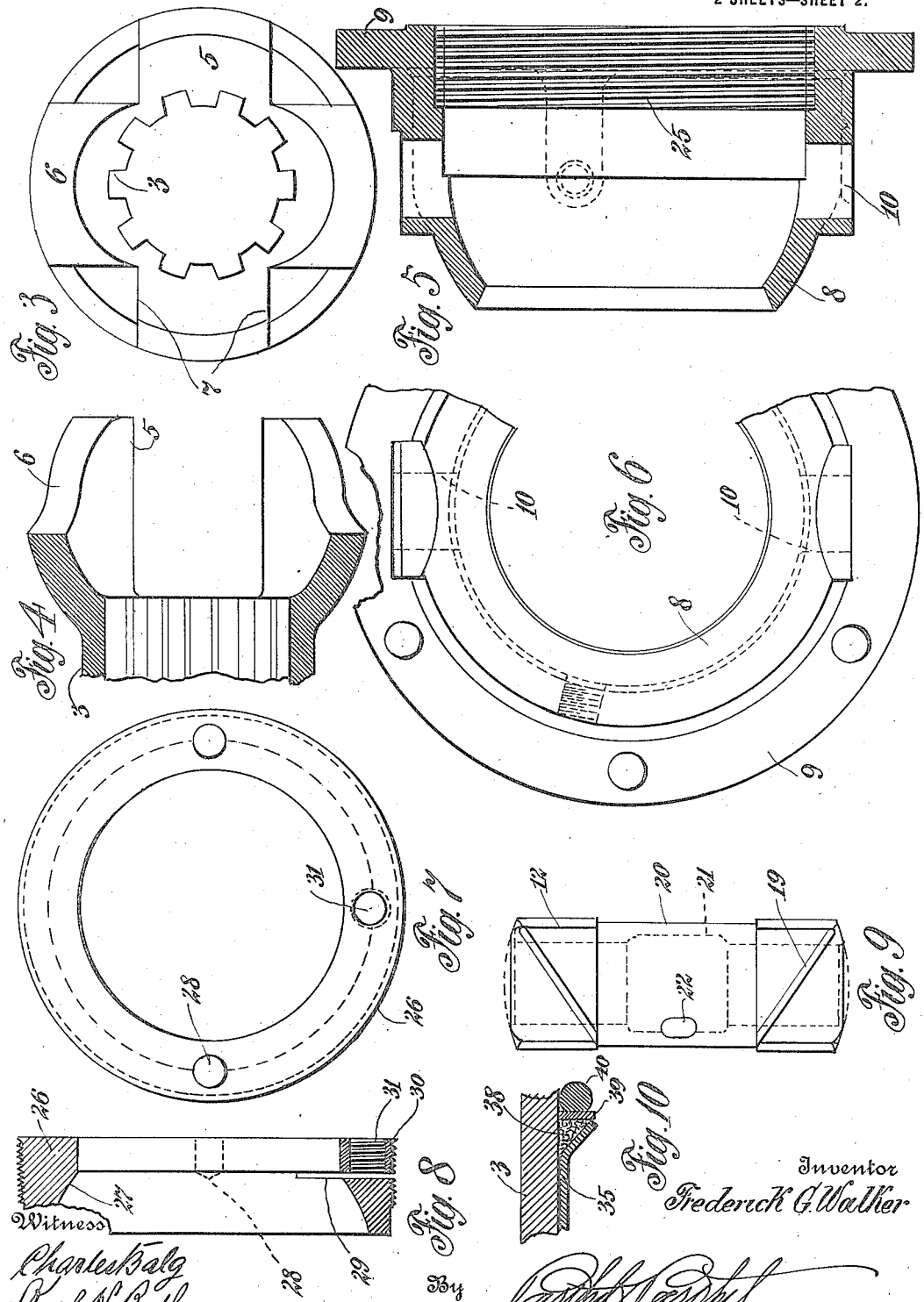

FREDERICK G. WALKER, OF DETROIT, MICHIGAN.

UNIVERSAL JOINT.

1,221,638.     Specification of Letters Patent.     Patented Apr. 3, 1917.

Application filed May 31, 1916. Serial No. 100,771.

*To all whom it may concern:*

Be it known that I, FREDERICK G. WALKER, a citizen of the United States of America, residing at Detroit, in the county of Wayne and State of Michigan, have invented certain new and useful Improvements in Universal Joints, of which the following is a specification, reference being had therein to the accompanying drawings.

This invention relates to a drive shaft, and has especial reference to that type of shaft used in connection with motor driven vehicles for transmitting power from the power plant of a vehicle to the rear axle or driven shaft of the traction wheels.

My invention aims to provide a drive shaft possessing all the prerequisites of a good power or transmission shaft, and associated therewith are novel universal joints, dust guards therefor, and certain structural features which contribute to a strong and durable drive shaft consisting of parts inexpensive to manufacture, easy to assemble, and highly efficient as a power transmitting element of a motor vehicle.

My invention also resides in the matters to be hereinafter described and then claimed, and reference will now be had to the drawings, wherein—

Figure 1 is an elevation of one end of the drive shaft, partly broken away and partly in section, illustrating in particular the universal joint on the end of the shaft;

Fig. 2 is a similar view of the opposite end of the shaft, taken on a plane at right angles to Fig. 1, illustrating the universal joint;

Fig. 3 is an end view of a ball member of the universal joint;

Fig. 4 is a longitudinal sectional view of a portion of the ball member;

Fig. 5 is a similar view of a socket member of the universal joint;

Fig. 6 is an end view of a portion of the same;

Fig. 7 is an end view of a bearing member of the universal joint;

Fig. 8 is a cross sectional view of a portion of the same;

Fig. 9 is a plan of a detached trunnion member of the universal joint, and

Fig. 10 is an enlarged detailed sectional view of a portion of a dust guard.

In describing my invention by aid of the views above referred to, I desire to point out that the same are intended as merely illustrative of the drive shaft and universal joint as now on the market, and I do not care to confine myself to the precise construction and arrangement of parts shown. The following description is therefore to be broadly construed as including substitute arrangements and construction of parts which are the obvious equivalents of those to be hereinafter referred to.

Reference will first be had to Fig. 2 in connection with the detail views shown in Figs. 3 to 10 inclusive. The reference numeral 1 denotes a drive shaft and one end of said shaft is formed with longitudinal and circumferentially disposed ribs 2 adapted to slide in a longitudinally grooved sleeve 3 forming part of a ball member 4 of the universal joint. The ribbed end of the shaft 1 constitutes a plurality of splines to coöperate with the sleeve 3 in forming a reciprocable or slide joint between the shaft 1 and the universal joint at the end thereof. The ball member 4 is hollowed out in forming intersecting slots 5 and 6, the slot 5 providing opposed parallel flat faces 7, the purpose of which will presently appear.

8 denotes a socket member having one end thereof somewhat semi-spherical, and the opposite end thereof cylindrical and provided with a peripheral flange or lugs 9. The socket member 8 receives the ball member 4 and permits of a universal movement of the ball member therein. Diametrically opposed walls of the socket member 8 are provided with openings 10 to receive the ends of a bolt 11 employed in connection with a trunnion member 12 to establish rotative continuity between the ball and socket members and yet permit of the ball member assuming an angular relation to the socket member. The bolt 11 is held against rotation by the head 13 thereof having a flat facet 14 engaging a shoulder 15 of the socket member, and said bolt is retained within the socket member by a nut 16 screwed thereon. The bolt 11, intermediate the ends thereof, has a reduced portion providing an annular lubricant channel 17 and communicating therewith are longitudinal grooves or branch channels 18 adapted for distributing a suitable lubricant throughout the periphery of the bolt 11.

The trunnion member 12 is rectangular in cross section at its ends to engage the opposed faces 7 of the ball member 4 and said trunnion member has angularly disposed grooves 19, at the ends thereof, in communication with the space in the ball member 4 around the cylindrical intermediate portion 20 of the trunnion member. The cylindrical intermediate portion 20 is hollowed out, as at 21 and provided with opposed ports 22, whereby a lubricant placed in the socket and ball member can readily pass through the ports 22 into the channel 17 and the grooves or branches 18 thereof. Such lubrication insures a non-frictional movement of the trunnion member 12 on the bolt 11 and by lubricant entering the grooves 19 of the trunnion member, the ball member 4 can readily shift relative to the ends of said trunnion member. In order that a lubricant can be easily placed in the socket member, said member has a filling opening 23 normally closed by a plug 24.

The flanged end of the socket member 8 is interiorly screwthreaded, as at 25, to receive a bearing member 26 provided with a concave seat 27 for the ball member 4 and the rounded ends of the trunnion member 12. The bearing member 26 will retain the ball and trunnion members in the socket member even though the bolt 11 is not in place, and to permit of the bearing member being easily adjusted to compensate for wear and maintain a proper relation between the ball and socket members, said bearing member has recesses 28 to accommodate a spanner wrench or similar tool. To lock the bearing member 26 against accidental rotation, said member has a lateral slit or slot 29 with the outer portion 30 of said member provided with a threaded opening 31 for a screw 32. By adjusting the screw 32 the portion 30 of said bearing member can be sprung relative to the remainder of the bearing member to bind the threads of the bearing member against the threads of the socket member 8, thereby locking the bearing member in the socket member.

Suitably connected to the socket member 8 is a cap 33 having a shaft connection 34 of the usual and well known type.

Associated with the end of the drive shaft shown in Fig. 2 is a novel dust guard and lubricant seal, comprising a cup member 35 formed with a holder 36 for a packing ring 37, said packing ring engaging the outer side of the socket member 8 to prevent dust and foreign matter from entering the socket member between said member and the ball member 4. The opposite end of the cup member 35 is slidable upon the sleeve 3 and a packing ring 38 and washer 39 are placed against the end of said member, said packing ring preventing loss of lubricant.

A coiled compression spring 40 encircles the sleeve 3 and bears against the washer 39, while the outer end of the spring 40 is held by a cap 41 screwed upon the end of the sleeve 3 and forming part of a stuffing box 42 surrounding the drive shaft 1. Since the sleeve is in communication with the ball and socket members, the lubricant can enter the sleeve 3 and insure an easy movement of the spline end of the shaft 1 in said sleeve, while the stuffing box 42 prevents loss of lubricant around the shaft 1.

The opposite end of the drive shaft 1 is practically the same as that described, with the exception, that the ball member has a solid shaft connection, instead of the sleeve 3, and an optional connection 43. The universal joint is identical with that previously described, also the dust guard, although the spring of the dust guard is held by a retaining ring 44 instead of the stuffing box 42.

I attach considerable importance to the bearing member 26 of the universal joint and the manner of locking the same in the ball socket, as it is possible to assemble the parts of the universal joints and maintain them in assembled relation without the caps 33 being attached to the socket members.

What I claim is:—

1. A universal joint comprising a socket member, a ball member therein, a bearing member screwed in said socket member against said ball member and inclosed by said socket member, and means carried by said bearing member adapted to lock said member in said socket member.

2. In a universal joint, the combination with a socket member, and a ball member extending therein, of a bearing member in said socket member against said ball member and having a yieldable portion, and means carried by said bearing member adapted to spring the yieldable portion of said bearing member to lock said member in said socket member.

In testimony whereof I affix my signature in the presence of two witnesses.

FREDERICK G. WALKER.

Witnesses:
 KARL H. BUTLER,
 ANNA M. DORR.